(12) United States Patent
Aizawa et al.

(10) Patent No.: US 11,305,711 B2
(45) Date of Patent: Apr. 19, 2022

(54) VEHICLE FRONT STRUCTURE

(71) Applicant: MAZDA MOTOR CORPORATION, Hiroshima (JP)

(72) Inventors: Makoto Aizawa, Aki-gun (JP); Tetsuo Nagata, Aki-gun (JP); Ryosuke Kawafune, Aki-gun (JP); Yuta Mishima, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/063,455

(22) Filed: Oct. 5, 2020

(65) Prior Publication Data
US 2021/0114540 A1 Apr. 22, 2021

(30) Foreign Application Priority Data

Oct. 18, 2019 (JP) .............................. JP2019-191291

(51) Int. Cl.
*B60R 19/12* (2006.01)
*B60R 21/34* (2011.01)
(Continued)

(52) U.S. Cl.
CPC .............. *B60R 19/12* (2013.01); *B60R 19/03* (2013.01); *B60R 19/22* (2013.01); *B60R 21/34* (2013.01);
(Continued)

(58) Field of Classification Search
CPC ......... B60R 19/02; B60R 19/03; B60R 19/12; B60R 21/34
(Continued)

(56) References Cited

U.S. PATENT DOCUMENTS 6,634,702 B1 * 10/2003 Pleschke ................. B60R 19/18
293/102
8,235,433 B2 * 8/2012 Gonin ..................... B60R 19/12
293/120
(Continued)

FOREIGN PATENT DOCUMENTS

DE 102015217465 A1 * 3/2017 ............. B60R 19/12
DE 102016200452 A1 * 7/2017 ........... B62D 25/084
(Continued)

OTHER PUBLICATIONS

The extended European search report issued by the European Patent Office dated Nov. 3, 2020, which corresponds to European Application No. 20200925.4-1132 and is related to U.S. Appl. No. 17/063,455.

*Primary Examiner* — Jason S Daniels
(74) *Attorney, Agent, or Firm* — Studebaker & Brackett PC

(57) ABSTRACT

An increased amount of absorption of a load from the diagonally upper front side is achieved even in, for example, a vehicle having a high vehicle height. A first shock absorbing member is provided inside a bumper face upper to absorb a load from the diagonally upper front side, a second shock absorbing member is mounted on a front face portion of a bumper beam, and a third shock absorbing member is disposed below the first shock absorbing member and between a bumper face and the bumper beam to absorb a load from the diagonally upper front side. The rigidity of the first and third shock absorbing members in the up-down direction is higher than rigidity of the second shock absorbing member in the front-rear direction.

10 Claims, 11 Drawing Sheets

(51) Int. Cl.
*B60R 19/03* (2006.01)
*B60R 19/22* (2006.01)
*B60R 19/18* (2006.01)

(52) U.S. Cl.
CPC .................. *B60R 2019/186* (2013.01); *B60R 2019/1873* (2013.01); *B60R 2021/343* (2013.01)

(58) Field of Classification Search
USPC .................................................. 293/120, 121
See application file for complete search history.

(56) References Cited

U.S. PATENT DOCUMENTS

| | | | | |
|---|---|---|---|---|
| 8,267,446 | B2* | 9/2012 | Gonin | B60R 19/12 293/136 |
| 2007/0144851 | A1* | 6/2007 | Ginja | B60R 19/18 188/377 |
| 2007/0182174 | A1* | 8/2007 | Nakayama | B60R 19/52 293/115 |
| 2009/0261601 | A1* | 10/2009 | Shin | B62D 25/084 293/115 |
| 2010/0127520 | A1* | 5/2010 | Ginja | B60R 19/12 293/146 |
| 2010/0244487 | A1* | 9/2010 | Gonin | B62D 29/043 296/187.09 |
| 2011/0115241 | A1* | 5/2011 | Gonin | B60R 19/12 293/120 |
| 2012/0049547 | A1* | 3/2012 | Nishi | B60R 19/18 293/132 |
| 2019/0248226 | A1* | 8/2019 | Shinohara | B60K 11/04 |
| 2019/0248313 | A1 | 8/2019 | Garbutt et al. | |

FOREIGN PATENT DOCUMENTS

| | | | |
|---|---|---|---|
| JP | 2007-230311 | A | 9/2007 |
| JP | 2014-104781 | A | 6/2014 |
| JP | 2014104781 | A * | 6/2014 |
| JP | 2019-038497 | A | 3/2019 |

* cited by examiner

VEHICLE FRONT STRUCTURE

BACKGROUND

Technical Field

The present disclosure relates to a vehicle front structure including, for example, a bumper face provided at a vehicle-body front face, a bumper face upper provided above the bumper face, and a bumper beam extending in the vehicle width direction on the rear side of the bumper face.

Background Art

Vehicles typically have a bumper face upper disposed at a portion in the vicinity of a position of an upper end of the front face (vehicle nose position) which forms an outer surface of the portion. As such a vehicle structure for protecting pedestrians, a structure has been known in which a shock absorbing member is disposed at an entire region from a front portion of the bumper face upper to the rear side so that the shock absorbing member absorbs a load with respect to load input from the diagonally upper front side, as in Japanese Patent Laid-Open No. 2019-38497.

However, in a case where, for example, the vehicle size class is increased and thus, for example, the vehicle height, namely, the vehicle nose position becomes higher, a load from the diagonally upper front side is easily locally input from the front portion of the entire region of the bumper face upper. This causes the shock absorbing member to absorb the load from the diagonally upper front side mainly at the front portion in the front-rear direction, thus requiring the shock absorbing member to have higher strength to absorb the same load as that input to the entire region. Consequently, there is a concern that the rise (injury value) of the load absorbed (received) by the vehicle body at the initial stage of collision becomes too high, which is not preferable from the viewpoint of protecting pedestrians.

Meanwhile, as in Japanese Patent Laid-Open No. 2014-104781, a structure has also been known in which, from the viewpoint of protecting pedestrians, a shock absorbing member (buffer member) is disposed also at a front face portion of a bumper beam extending in the vehicle width direction on the lower side with respect to the region of the bumper face upper to absorb a load with respect to load input from the front side.

It is also conceivable that this shock absorbing member is used for compensating for an insufficiency of an amount of absorption of a load from the diagonally upper front side in the shock absorbing member provided at the region of the bumper face upper. However, in the first place, this shock absorbing member is disposed at a low height corresponding to the bumper beam in consideration of load input from the front side and is formed of an EA member to have rigidity suitable for protecting pedestrians at the height. Thus, the shock absorbing member is not suitable for compensating for the insufficiency of absorption of a load from the diagonally upper front side.

SUMMARY

Therefore, the present disclosure provides a vehicle front structure capable of allowing even, for example, a vehicle having a high vehicle height to have an increased amount of absorption of a load from the diagonally upper front side.

The present disclosure is a vehicle front structure including a bumper face provided at a vehicle-body front face, a bumper face upper provided above the bumper face, and a bumper beam extending in a vehicle width direction on a rear side of the bumper face. The vehicle front structure includes a first shock absorbing member provided inside the bumper face upper to absorb a load from a diagonally upper front side, a second shock absorbing member mounted on a front face portion of the bumper beam to absorb a load from a front side, and a third shock absorbing member disposed below the first shock absorbing member and between the bumper face and the bumper beam to absorb a load from the diagonally upper front side. Also, rigidity of the first and third shock absorbing members in an up-down direction is set to be higher than rigidity of the second shock absorbing member in a front-rear direction.

According to the configuration, an insufficiency of absorption of a load from the diagonally upper front side in the first shock absorbing member provided at a region of the bumper face upper is compensated for by the third shock absorbing member provided below the region of the bumper face upper, so that an increased amount of absorption of a collision load from the diagonally upper front side can be achieved.

In an aspect of the present disclosure, a lower end of the third shock absorbing member is disposed so as to be located above the second shock absorbing member.

According to the configuration, the third shock absorbing member can absorb a load from the diagonally upper front side without negatively affecting a load absorption performance from the front side which the second shock absorbing member provided at the front face portion of the bumper beam has.

In an aspect of the present disclosure, the first shock absorbing member is disposed between headlamps provided on respective left and right sides of the vehicle-body front face, the third shock absorbing member includes a vehicle-width-direction center portion corresponding to a lower side between the left and right headlamps, and a vehicle-width-direction outer-side portion extending from the vehicle-width-direction center portion up to a position below the headlamp. Also, the vehicle-width-direction outer-side portion is disposed at a position above the vehicle-width-direction center portion.

According to the configuration, the vehicle-width-direction outer-side portion is disposed at the position above the vehicle-width-direction center portion, so that a load from the diagonally upper front side can be effectively absorbed at a position higher than the vehicle-width-direction center portion.

In an aspect of the present disclosure, a fourth shock absorbing member having lower rigidity in the up-down direction than the first shock absorbing member is continuously disposed behind the first shock absorbing member.

According to the configuration, the first shock absorbing member is reduced by disposing the third shock absorbing member, and the fourth shock absorbing member can be disposed, so that the rear side of the region of the bumper face upper enables shock absorption at a load which is lower than that applied to the front side.

According to the present disclosure, an increased amount of absorption of a load from the diagonally upper front side can be achieved even in, for example, a vehicle having a high vehicle height.

DETAILED DESCRIPTION

Figure 1:
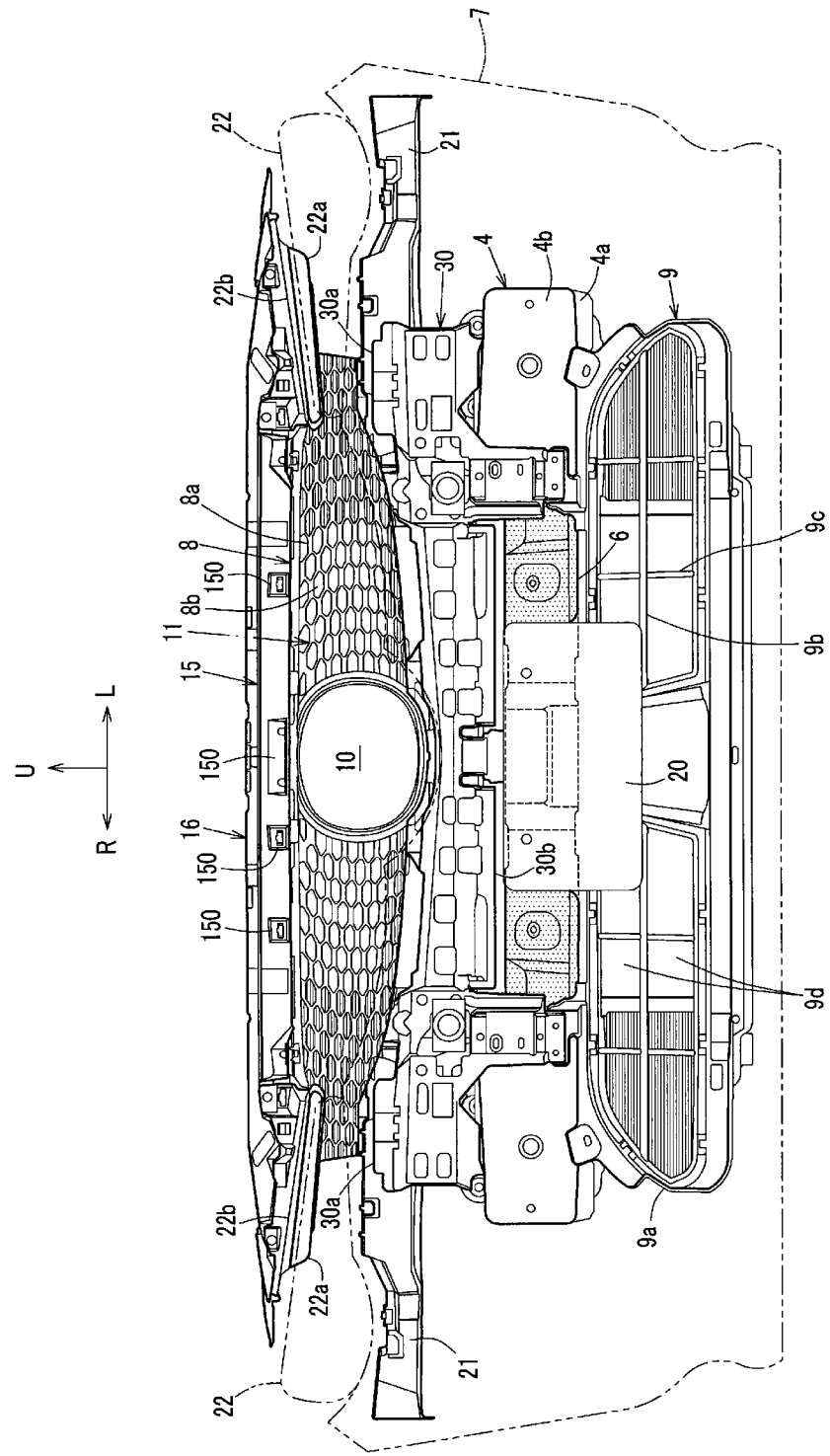
FIG. 1 is a front view of a vehicle front structure of the present embodiment.
Figure 2:
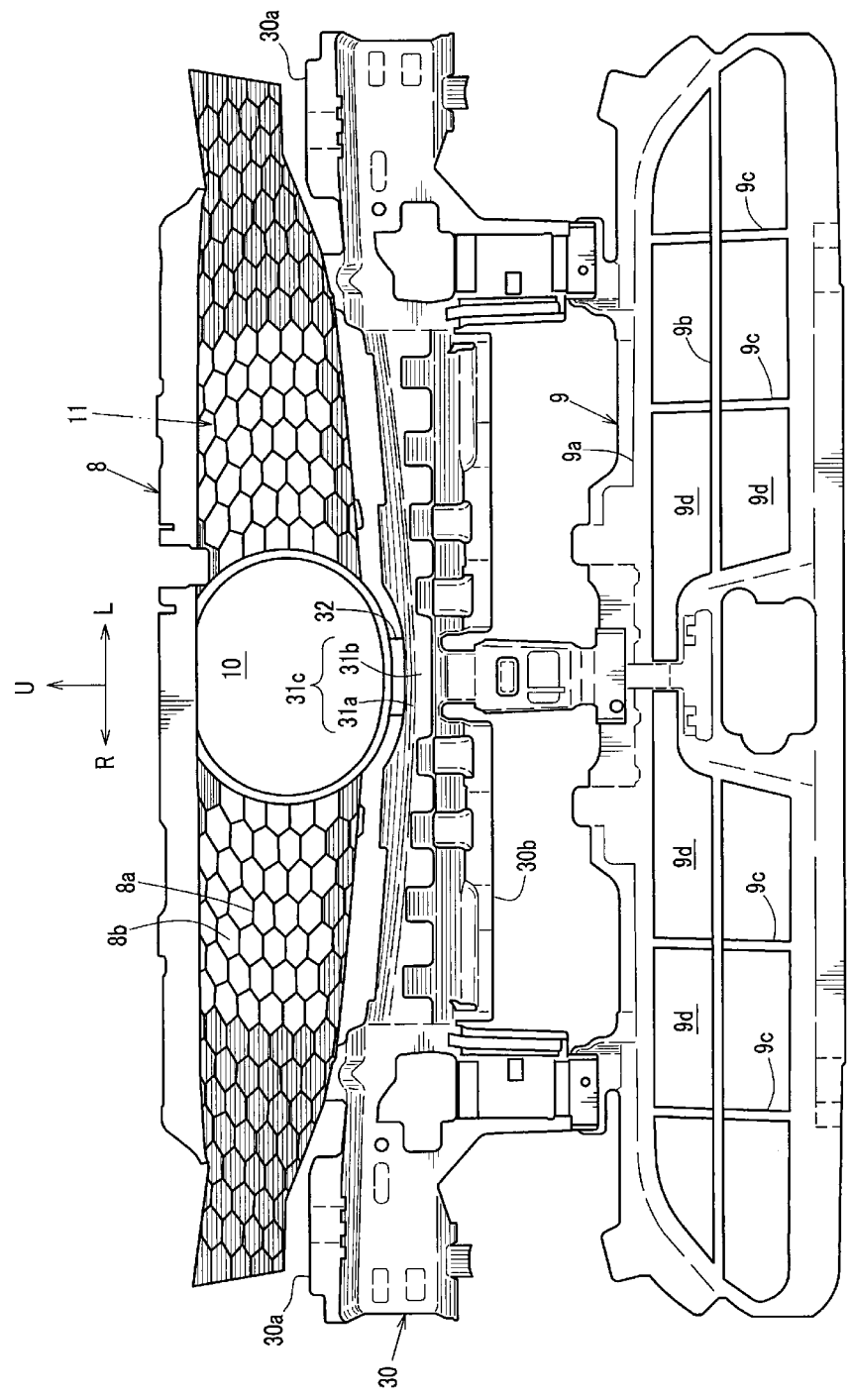
FIG. 2 is a front view showing a front grille, a shock absorbing member, and a lower-side grille.
Figure 3:
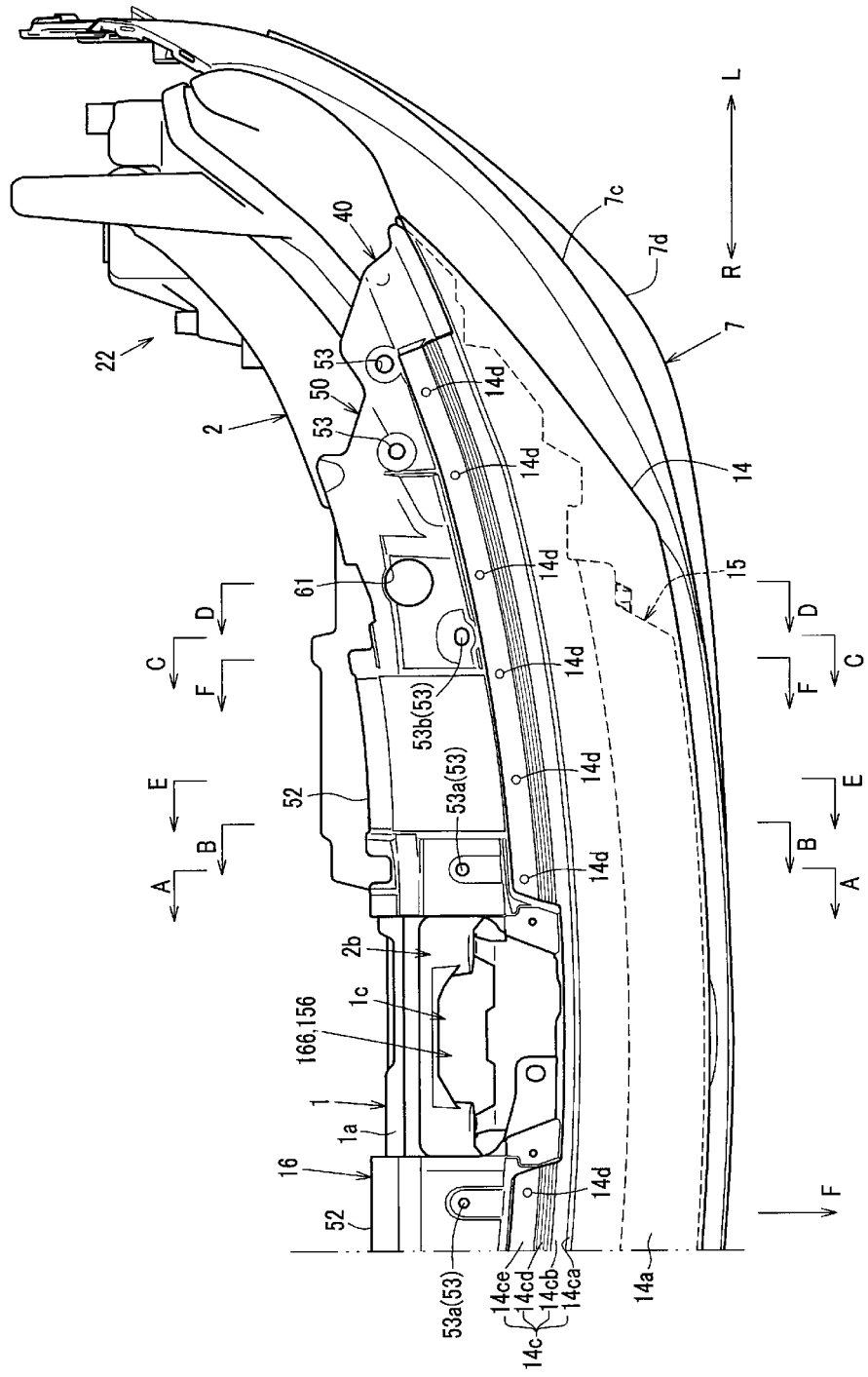
FIG. 3 is an enlarged plan view of a main portion of the vehicle front structure of the present embodiment.
Figure 4:
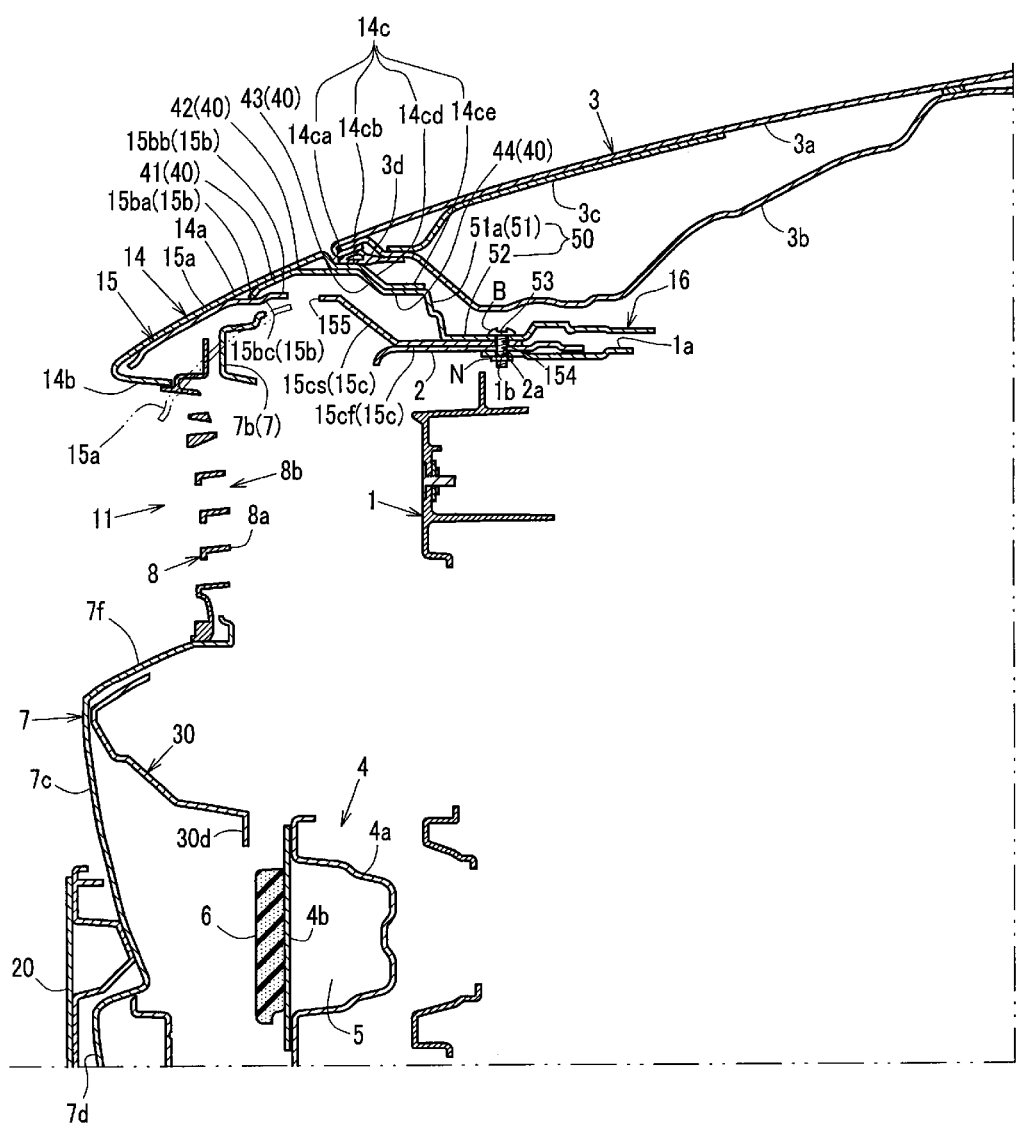
FIG. 4 is an arrow cross-sectional view of a main portion taken along line A-A in FIG. 3.
Figure 5:
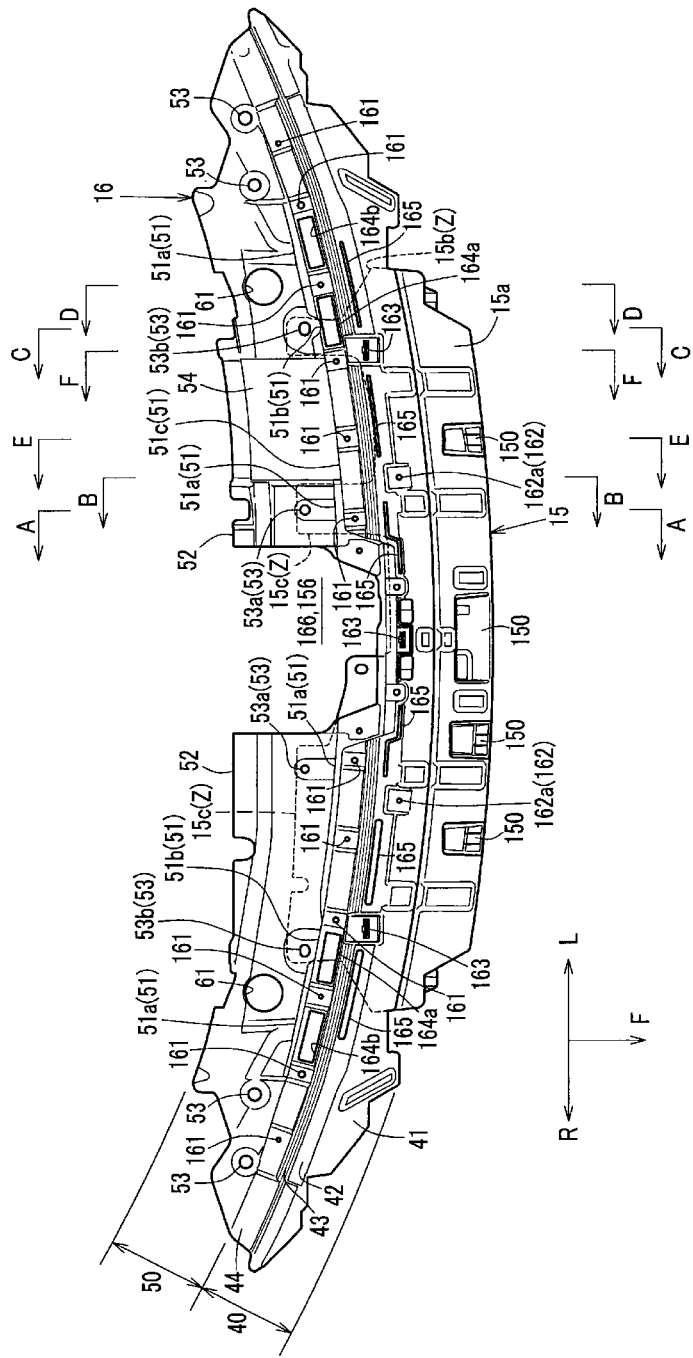
FIG. 5 is a plan view of upper front-side and upper rear-side shock absorbing members of the present embodiment.
Figure 6:
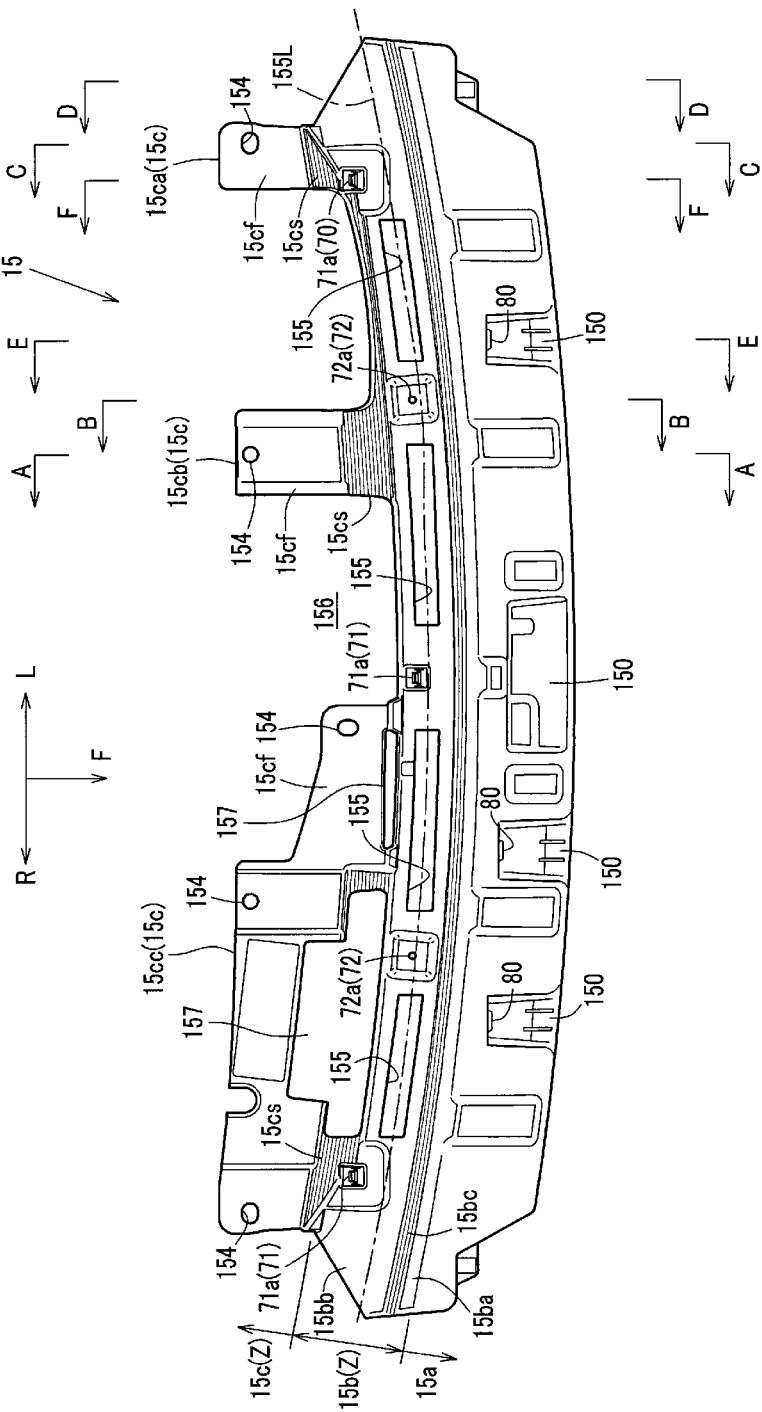
FIG. 6 is a plan view of the upper front-side shock absorbing member of the present embodiment.
Figure 7:
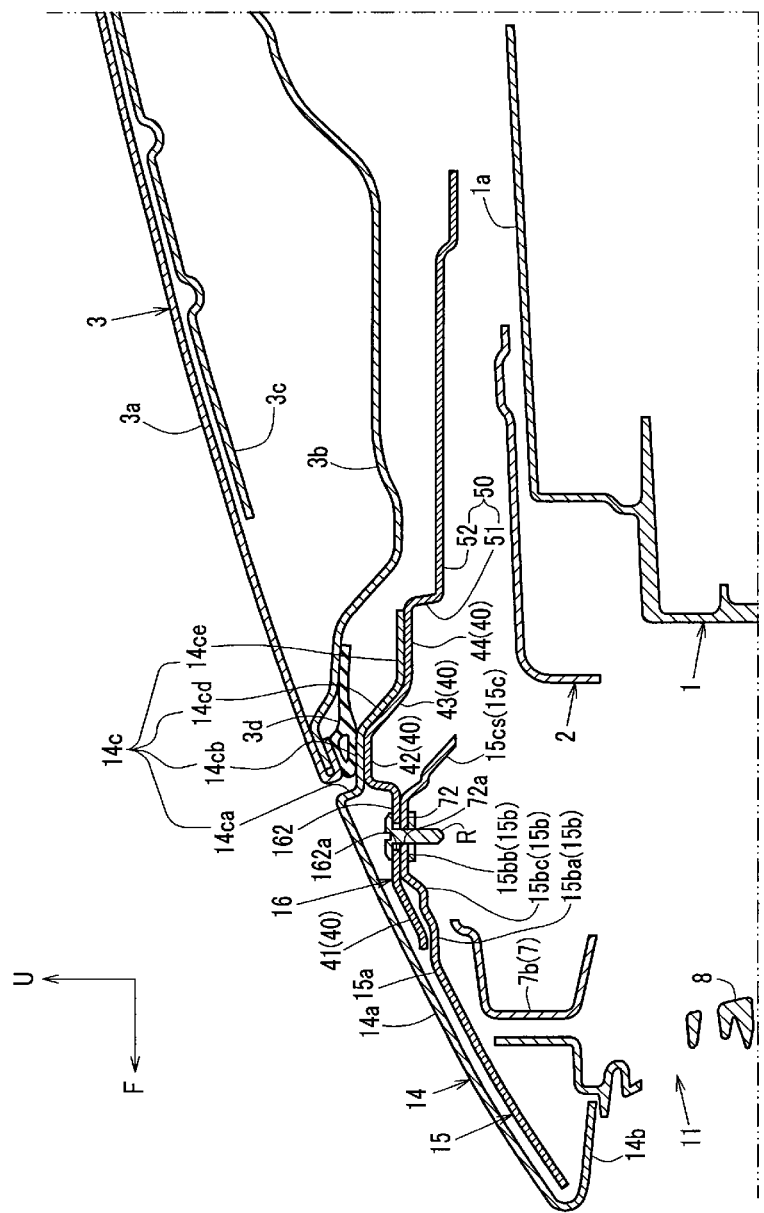
FIG. 7 is an arrow cross-sectional view of a main portion taken along line B-B in FIG. 3.
Figure 8:
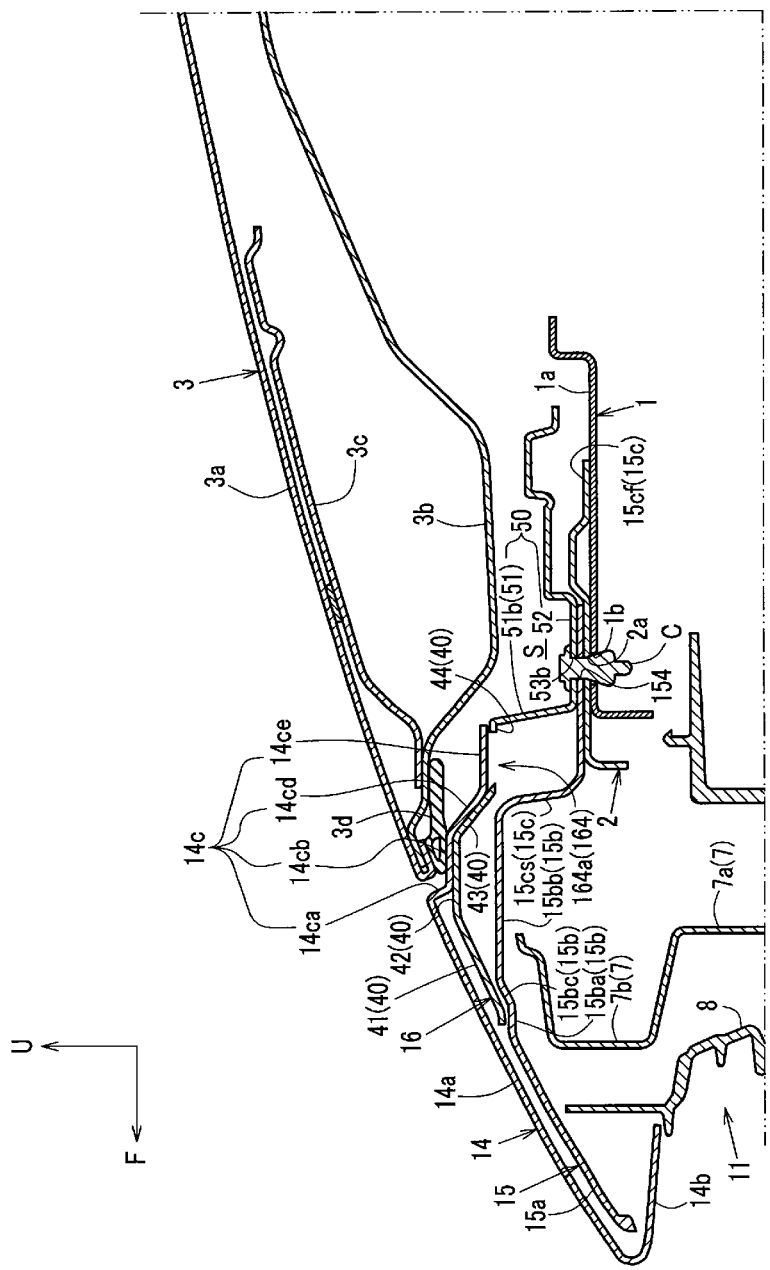
FIG. 8 is an arrow cross-sectional view of a main portion taken along line C-C in FIG. 3.
Figure 9:
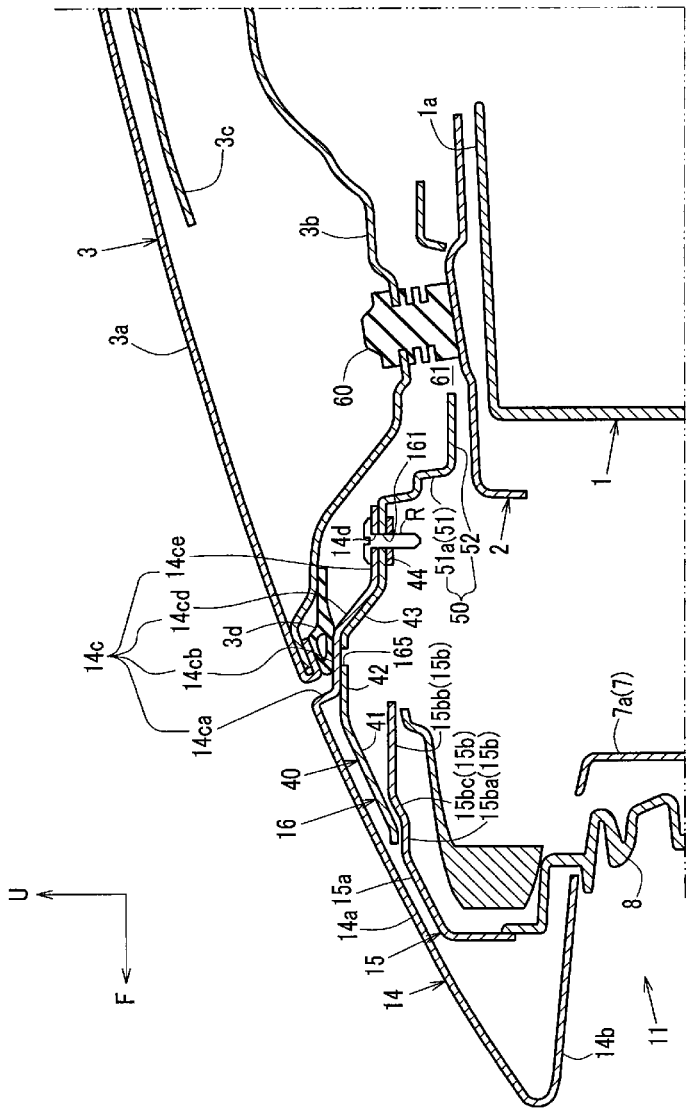
FIG. 9 is an arrow cross-sectional view of a main portion taken along line D-D in FIG. 3.
Figure 10:
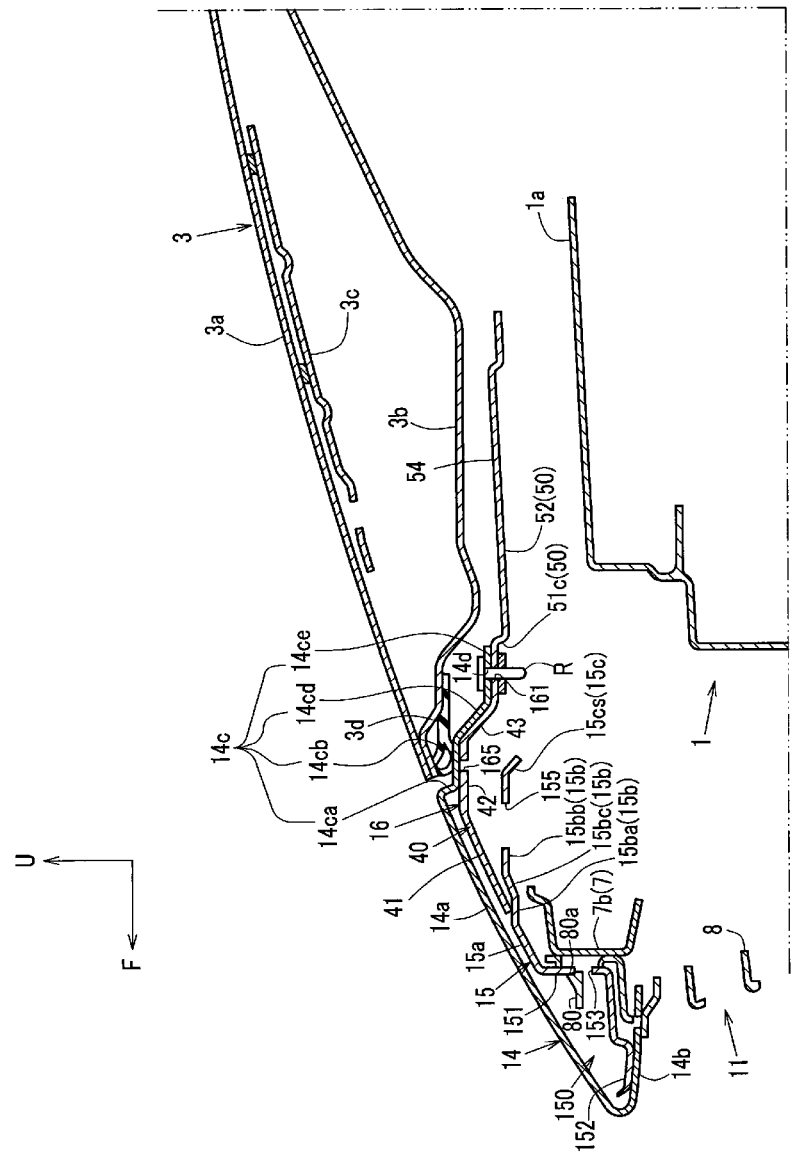
FIG. 10 is an arrow cross-sectional view of a main portion taken along line E-E in FIG. 3.
Figure 11:
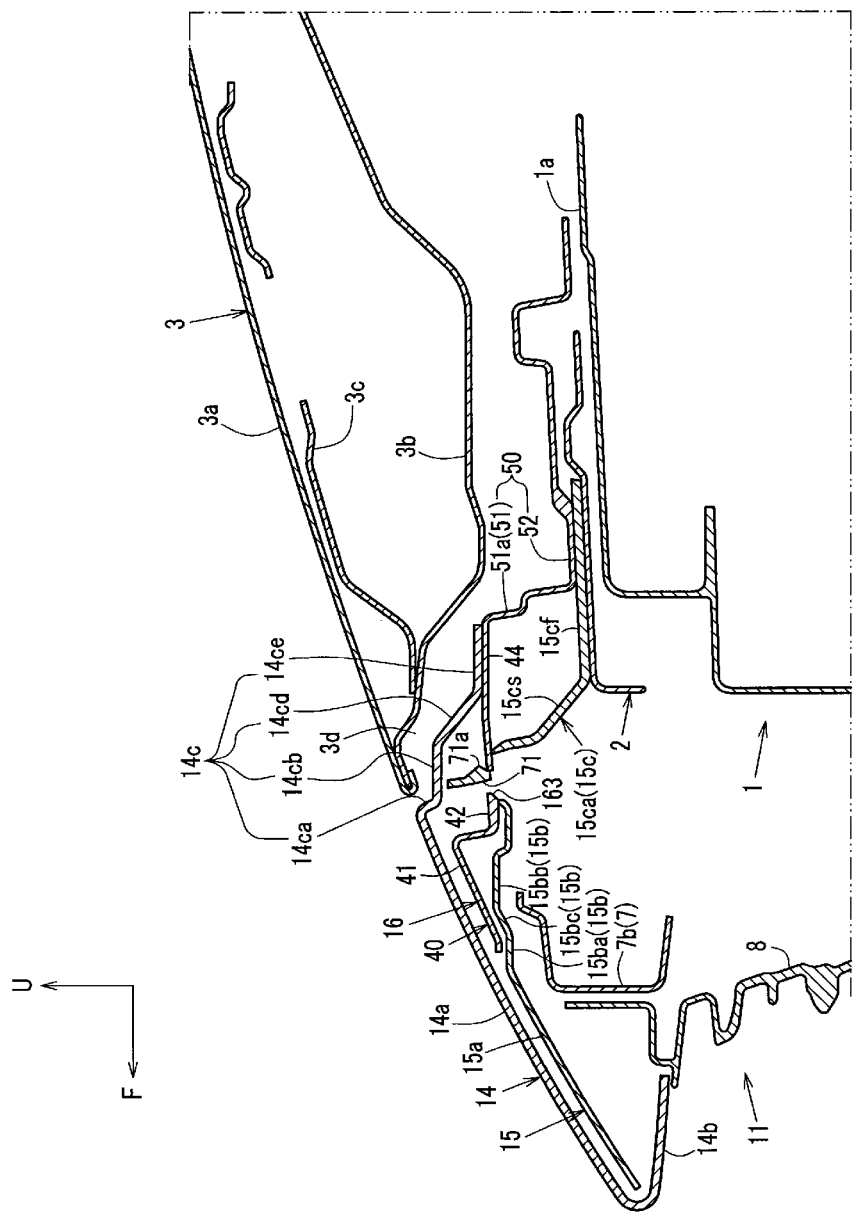
FIG. 11 is an arrow cross-sectional view of a main portion taken along line F-F in FIG. 3.

An embodiment of a vehicle front structure of the present disclosure will be explained with reference to the following drawings. FIG. 1 is a front view of the vehicle front structure of the present embodiment. FIG. 2 is a front view showing a front grille, an intermediate shock absorbing member, and a lower-side grille. FIG. 3 is an enlarged plan view of a vehicle-width-direction center and left side of the vehicle front structure of the present embodiment. FIG. 4 is an arrow cross-sectional view of a main portion taken along line A-A in FIG. 3, and the arrow cross-sectional view of the vehicle front structure is shown corresponding to lines A-A in FIGS. 5 and 6. FIG. 5 is a plan view of upper front-side and upper rear-side shock absorbing members of the present embodiment. FIG. 6 is a plan view of the upper front-side shock absorbing member of the present embodiment. FIG. 7 is an arrow cross-sectional view of a main portion taken along line B-B in FIG. 3, and the arrow cross-sectional view of the vehicle front structure is shown corresponding to lines B-B in FIGS. 5 and 6. FIG. 8 is an arrow cross-sectional view of a main portion taken along line C-C in FIG. 3, and the arrow cross-sectional view of the vehicle front structure is shown corresponding to lines C-C in FIGS. 5 and 6. FIG. 9 is an arrow cross-sectional view of a main portion taken along line D-D in FIG. 3, and the arrow cross-sectional view of the vehicle front structure is shown corresponding to lines D-D in FIGS. 5 and 6. FIG. 10 is an arrow cross-sectional view of a main portion taken along line E-E in FIG. 3, and the arrow cross-sectional view of the vehicle front structure is shown corresponding to lines E-E in FIGS. 5 and 6. FIG. 11 is an arrow cross-sectional view of a main portion taken along line F-F in FIG. 3, and the arrow cross-sectional view of the vehicle front structure is shown corresponding to lines F-F in FIGS. 5 and 6.

Illustration of a bumper face upper 14 is omitted in FIGS. 1 and 2, and illustration of a bonnet 3 is omitted in FIGS. 1 to 3. Furthermore, in the drawings, arrow F indicates the vehicle front direction; arrow R, the vehicle right direction; arrow L, the vehicle left direction; arrow U, the vehicle upper direction. Furthermore, illustration of a rivet R, a clip C, a bolt B, and a nut N is omitted in FIGS. 3, 5, and 6.

As shown in FIGS. 1 to 4, the vehicle front structure includes a bumper face 7 (see FIGS. 1, 3, and 4), the bumper face upper 14 (see FIGS. 3 and 4), a front grille 8 (see FIGS. 1, 2, and 4), a bumper beam 4 (see FIGS. 1 and 4), the bonnet 3 (see FIG. 4), a headlamp 22 (see FIG. 1), and shock absorbing members 15, 6, 30, and 16 (see FIGS. 1 and 3).

The bumper face 7, the bumper face upper 14, and the front grille 8 constitute an outer surface except for a lower portion with respect to the bumper face 7 at a vehicle front face. As shown in FIGS. 1 and 3, at an upper portion of the bumper face 7 and a vehicle-width-direction center thereof, a grille opening 11 is formed. The grille opening 11 is an outside air inlet that introduces outside air for cooling into an engine compartment to cause a radiator (illustration omitted) disposed on the front side of the engine compartment behind the bumper face 7 to dissipate heat.

The front grille 8 covers the grille opening 11 and, as shown in FIGS. 1 and 2, extends up to both outer sides in the vehicle width direction with respect to a portion corresponding to, as viewed in front, the grille opening 11 provided at a vehicle-width-direction center portion of the bumper face 7. Specifically, as shown in FIG. 1, the front grille 8 is provided between the headlamps 22 provided on both sides of the vehicle front face, has a vehicle-width-direction outer end on each of the left and right sides which extends up to the vehicle-width-direction inner side of the headlamp 22, and is mounted on the bumper face 7 and the bumper face upper 14.

As shown in FIGS. 1 and 4, in the front grille 8, cells 8a in a hexagonal frame shape as viewed in vehicle front are vertically and horizontally disposed at an entire face, forming a number of through holes 8b corresponding to the respective cells 8a. Of these through holes 8b, the through hole 8b facing to the grille opening 11 communicates with the grille opening 11 (see FIG. 4).

As shown in the drawings, at a lower portion of the bumper face 7 and the vehicle-width-direction center thereof, a lower grille opening (illustration omitted) for introducing outside air similarly to the grille opening 11 is formed, and a lower front grille 9 is disposed immediately therebehind (see FIGS. 1 and 2).

As shown in FIGS. 1 and 2, in the lower front grille 9, an outer frame 9a in a ring shape elongated in the vehicle width direction is provided with a horizontal crosspiece 9b and a plurality of vertical crosspieces 9c which are spaced apart from each other, forming an opening 9d for introducing outside air, and the opening 9d communicates with the lower grille opening on the bumper face 7 side.

As shown in FIG. 4, the above-described bumper face 7 is formed by integrating a receding portion 7a (see FIG. 8) located behind the front grille 8, an upper end portion 7b located on the upper side of the receding portion 7a, an intermediate portion 7c located below the front grille 8 and on the front side thereof, and a lower piece portion 7d located below the intermediate portion 7c and having lower grille openings 12 and 13 formed to pass therethrough in a wide shape from a center portion thereof as viewed in front.

As shown in FIGS. 1 and 2, an emblem 10 is provided immediately in front of a vehicle-width-direction center of the front grille 8.

As shown in FIGS. 3 and 4, at the upper portion of the bumper face 7, namely, above the front grille 8, the bumper face upper 14 is provided in an eaves shape. The bumper face upper 14 extends in the vehicle width direction at a position of an upper end of the vehicle front face (nose) and forms an outer surface in the vicinity of the upper end of the front face.

Specifically, as shown in FIGS. 3 and 4, the bumper face upper 14 includes a top face portion 14a extending rearward from the upper end of the vehicle front face (vehicle nose position), a bottom face portion 14b (see FIG. 4) formed to be substantially horizontally folded from a front end of this top face portion 14a toward the front side of an upper portion of the front grille 8, and a rear extending portion 14c extending further rearward from a rear end of the top face portion 14a.

The top face portion 14a is provided between the upper end of the vehicle front face and a front end of the bonnet 3 and is formed to be inclined in a front-low rear-high shape so as to be, in the front-rear direction, continuous with a top face of the bonnet 3 (bonnet outer panel 3a described later) at the time of closing from the upper end of the front face. The rear end (upper end) of the top face portion 14a faces to the front end of the bonnet 3 with a slight gap.

As shown in FIG. 4, the rear extending portion 14c extends rearward and downward substantially along a shape of a bonnet inner panel 3b in the front-rear direction at a front portion of the bonnet 3 so as to be disposed below the bonnet 3 from the front end thereof.

Specifically, the rear extending portion 14c is formed by integrating a front-side stepped portion 14ca stepped down from the rear end of the top face portion 14a, a front-side horizontal portion 14cb extending substantially horizontally rearward from a lower end of the front-side stepped portion 14ca, a rear-side inclined portion 14cd stepped down from a rear end of the front-side horizontal portion 14cb, and a rear-side horizontal portion 14ce extending substantially horizontally rearward from a lower end of the rear-side inclined portion 14cd. As shown in FIGS. 1, 3, and 4, inside the bumper face upper 14, namely, below the top face portion 14a, there is provided the upper front-side shock absorbing member 15 (first shock absorbing member) that absorbs a collision load from the diagonally upper front side. This upper front-side shock absorbing member 15 is formed of fiber reinforced plastic.

As shown in FIGS. 1 and 3 to 5, inside the bumper face upper 14, namely, below the top face portion 14a and on the upper side of a rear portion with respect to the upper front-side shock absorbing member 15, there is provided the upper rear-side shock absorbing member 16 (fourth shock absorbing member) that absorbs a collision load from the diagonally upper front side. This upper rear-side shock absorbing member 16 is formed of synthetic resin such as polypropylene.

Thus, the upper shock absorbing members 15 and 16 (upper front-side shock absorbing member 15 and upper rear-side shock absorbing member 16) are provided inside the bumper face upper 14, wherein the upper front-side shock absorbing member 15 having relatively high rigidity is disposed on the front side and the upper rear-side shock absorbing member 16 having low rigidity is disposed on the rear side.

Furthermore, as shown in FIG. 1, the upper front-side shock absorbing member 15 is disposed between the headlamps 22 on both sides. The upper front-side shock absorbing member 15 continuously extends in the vehicle width direction so as to connect the vehicle-width-direction inner end sides of the headlamps 22 on both sides, specifically, mounting brackets 22b for mounting a molding 22a described later.

Namely, the upper front-side shock absorbing member 15 is not formed at, in the vehicle width direction, portions corresponding to the left and right headlamps 22 (see FIG. 1). Meanwhile, the upper rear-side shock absorbing member 16 has a center portion in the vehicle width direction disposed immediately behind the upper front-side shock absorbing member 15 and on the immediately upper side thereof and has both sides in the vehicle width direction which each continuously extend up to above a position corresponding to the headlamp 22 corresponding to each of the left and right sides.

The upper front-side shock absorbing member 15 and the upper rear-side shock absorbing member 16 will be described later.

As shown in FIG. 4, the upper side of the engine compartment is covered by the bonnet 3 so as to be openable and closable. In this example, the bonnet 3 has a rear end pivotally supported by the vehicle body via a hinge (illustration omitted) and is configured to open and close in the up-down direction.

The bonnet 3 is configured by joining the bonnet outer panel 3a and the bonnet inner panel 3b by hemming for integration, and a bonnet reinforcement 3c is bonded and fixed on the bottom face side of the bonnet outer panel 3a.

At least a front edge lower portion of a peripheral edge of the bonnet 3 includes a parting seal 3d. The parting seal 3d abuts against a top face of the front-side horizontal portion 14cb of the bumper face upper 14 at the time of closing the bonnet 3, so that a water stopping performance between the front edge of the bonnet 3 and the front-side horizontal portion 14cb of the bumper face upper 14 is secured.

On each of both left and right sides of the engine compartment, there is provided a front side frame (illustration omitted) extending in the vehicle front-rear direction. On a front end of the front side frame, a crash can is mounted via a set plate (illustration omitted).

At a position behind the lower portion of the bumper face 7 and on the front side of the engine compartment, there is provided the bumper beam 4 extending in the vehicle width direction so as to connect front ends of a pair of the left and right crash cans (see FIGS. 1 and 4). As shown in FIG. 4, this bumper beam 4 includes a bumper beam closed cross-section 5 which bonds and fixes a bumper beam body 4a and a closing plate 4b and extends in the vehicle width direction (see FIG. 4).

Immediately behind the bumper beam 4 and on the front side of the engine compartment, a radiator shroud 1 is disposed (see FIG. 4), and the radiator shroud 1 (hereinafter abbreviated as the "shroud 1") is supported by the bumper beam 4. The shroud 1 is formed in, as viewed in front, a rectangular frame shape between the front side frames on the front side of the engine compartment and supports the radiator (illustration omitted) and the like.

As shown in FIG. 3, a top face portion 1a of the shroud 1 is disposed slightly below a portion (rear extending portion 15c described later) on the rear side of the upper front-side shock absorbing member 15 and, in this example, at a height corresponding to an upper portion of the grille opening 11 and, as shown in FIG. 3, is mounted on an apron reinforcement (illustration omitted) via a shroud upper 2 extending in the vehicle width direction.

Furthermore, at a front face portion of the bumper beam 4, namely, at a front face of the closing plate 4b, as shown in the drawing, the lower shock absorbing member 6 (second shock absorbing member) made of styrene foam formed of polyethylene, polystyrene, or the like is disposed. This lower shock absorbing member 6 is made of a so-called EA foam material continuously extending in the vehicle width direction within a range between the left and right crash cans and absorbs a collision load mainly from the front side.

In FIG. 1, reference numeral 21 denotes a lamp bracket supporting the headlamp 22; reference character 22a, a molding as a decorative member provided along an upper edge of the headlamp 22; reference character 22b, the mounting bracket for mounting the molding 22a on the upper edge of the headlamp 22. Furthermore, as shown in FIG. 1, a license plate 20 is provided at a vehicle-width-direction center of an intermediate portion of the bumper face 7 via a base member.

As shown in FIGS. 1 and 2, below the upper front-side shock absorbing member 15 and above the lower shock absorbing member 6, and as shown in FIG. 4, between the bumper face 7 and the bumper beam 4, namely, on the rear side near the upper portion of the bumper face 7, the intermediate shock absorbing member 30 (third shock absorbing member) that absorbs a collision load from the diagonally upper front side is disposed.

As shown in FIG. 4, a lower end 30d of the intermediate shock absorbing member 30 is disposed so as to be located above an upper end of the lower shock absorbing member 6 throughout in the vehicle width direction, namely, so as not to overlap with the lower shock absorbing member 6 in the up-down direction. This intermediate shock absorbing member 30 is disposed below the front grille 8 and the headlamps 22 on both sides (see FIGS. 1 and 2) and has both sides each continuously extending toward the vehicle-width-direction outer side up to immediately under the vehicle-width-direction inner side of each of the left and right headlamps 22. Namely, both sides of the intermediate shock absorbing member 30 both extend toward the vehicle-width-direction outer side with respect to the upper front-side shock absorbing member 15.

Furthermore, as shown in FIGS. 1 and 2, the intermediate shock absorbing member 30 is formed so that a vehicle-width-direction outer-side portion 30a located at least immediately under the headlamp 22 is one step higher than a vehicle-width-direction center portion 30b located below the upper front-side shock absorbing member 15.

Namely, the intermediate shock absorbing member 30 has a shape which is advantageous when, rather than the vehicle-width-direction center portion 30b, the vehicle-width-direction outer-side portion 30a receives a collision load from the diagonally upper front side.

This compensates for reduction in an amount of absorption of a collision load from the diagonally upper front side as compared with the vehicle-width-direction center portion 30b, which is caused by not disposing the upper front-side shock absorbing member 15 above the vehicle-width-direction outer-side portion 30a of the intermediate shock absorbing member 30.

Here, the intermediate shock absorbing member 30 is formed of synthetic resin such as polypropylene, similarly to the upper rear-side shock absorbing member 16. Furthermore, as described above, the upper front-side shock absorbing member 15 is formed of fiber reinforced plastic, and the lower shock absorbing member 6 is formed of a so-called EA foam material.

Namely, the intermediate shock absorbing member 30 and the upper front-side shock absorbing member 15 that absorb a collision load from the diagonally upper front side are set to have higher rigidity than the lower shock absorbing member 6 that absorbs a collision load from the front side.

Next, of the above-described upper shock absorbing members 15 and 16, the upper front-side shock absorbing member 15 will be described in detail. As shown in FIGS. 4 and 6 to 8, particularly in FIG. 6, the upper front-side shock absorbing member 15 is formed by integrating a front portion 15a, a rear portion 15b, and the rear extending portion 15c.

Of these, the rear portion 15b and the rear extending portion 15c, as shown particularly in FIGS. 5 and 6, correspond to a region (hereinafter referred to as an "upper rear-side shock absorbing member disposition region Z") where the upper rear-side shock absorbing member 16 is disposed from above in a state where the upper front-side shock absorbing member 15 and the upper rear-side shock absorbing member 16 are assembled.

As shown in FIGS. 4 and 6 to 8, the substantially entire front portion 15a in the vehicle width direction extends to be inclined in a front-low rear-high shape along the top face portion 14a from a substantially front end of the bumper face upper 14 and abuts against a bottom face of the top face portion 14a. A rear end of the front portion 15a extends rearward up to a middle portion (substantially intermediate portion) of the top face portion 14a in the front-rear direction, namely, up to in front of a front end of the upper rear-side shock absorbing member 16 (see FIG. 4).

As shown in FIGS. 1, 5, and 6, the front portion 15a of the upper front-side shock absorbing member 15 has a plurality of (four, in this example) recesses 150 recessed with respect to the top face portion 14a of the bumper face upper 14 which are disposed to be spaced apart from each other in the vehicle width direction. As shown in FIG. 6, these recesses 150 are disposed at a center portion of the front portion 15a in the vehicle width direction, a left-side portion thereof, and two portions thereof on the respective vehicle-width-direction inner and outer sides on the right side, respectively.

As shown in FIG. 10, the four recesses 150 each have a vertical face portion 151 extending in the up-down direction so as to form a rear face of the recess 150, and a horizontal portion 152 substantially horizontally extending in the front-rear direction so as to form a bottom face (underside), forming an orthogonal cross-section in the vehicle width direction in a substantially L shape.

Of these four recesses 150, three recesses 150 other than the recess 150 disposed at a vehicle-width-direction center portion of the upper front-side shock absorbing member 15 each have an engaging hole 153 passing therethrough in the front-rear direction (in the plate thickness direction of the vertical face portion 151) at an intermediate portion of the vertical face portion 151 in the up-down direction.

Meanwhile, the upper portion of the above-described front grille 8 is disposed immediately behind the vertical face portion 151 of the upper front-side shock absorbing member 15, and, in the vehicle width direction of the upper portion, a portion corresponding to each engaging hole 153 has an engaging protrusion 80 protruding forward. Each engaging hole 153 is engaged with a claw 80a provided at a tip of the engaging protrusion 80 corresponding thereto (see FIGS. 6 and 10).

As shown in FIGS. 4 and 5, the rear portion 15b extends substantially horizontally rearward so as to be disposed under the upper rear-side shock absorbing member 16 from the rear end of the front portion 15a. As shown in FIGS. 4 and 7 to 9, a front-side portion 15ba of the rear portion 15b and a rear-side portion 15bb thereof are both substantially horizontally formed, while the rear-side portion 15bb of the rear portion 15b is disposed at a position slightly higher than the front-side portion 15ba via a stepped portion 15bc located between these (see FIG. 4).

As shown in FIG. 6, at the rear-side portion 15bb of the rear portion 15b, a plurality of (two, in this example) connecting portions 72 are disposed along the vehicle width direction which connect to the upper rear-side shock absorbing member 16 in the up-down direction.

Specifically, the connecting portions 72 are formed in a seat surface shape on the respective left and right sides of the rear-side portion 15bb of the rear portion 15b and, as shown in FIGS. 6 and 7, each have a connecting hole 72a passing therethrough in the up-down direction at a center portion of the connecting portion 72 as viewed in plan.

Furthermore, as shown in FIGS. 6 and 11, at the rear-side portion 15bb of the rear portion 15b, a plurality of (three, in this example) engaging protrusions 71 are disposed which engage with the upper rear-side shock absorbing member 16 in the up-down direction.

Specifically, the engaging protrusions 71 are formed on, in the rear-side portion 15bb of the rear portion 15b, both left and right outer sides (the vehicle-width-direction outer side with respect to the connecting portion 72 corresponding to each of the left and right sides) and a vehicle-width-direction center to protrude upward, and each have a claw 71a at an upper portion (tip portion) which protrudes rearward (see FIG. 11).

As shown in FIG. 6, a plurality of (three, in this example) the rear extending portions 15c are provided so as to protrude rearward from a portion of a rear end of the rear portion 15b in the vehicle width direction and are disposed to be spaced apart from each other in the vehicle width direction.

Specifically, the rear extending portion 15c includes, in the upper front-side shock absorbing member 15, a left outer-side rear extending portion 15ca disposed on the vehicle-width-direction outer side on the left side, a left inner-side rear extending portion 15cb disposed on the vehicle-width-direction inner side on the left side, and a right-side rear extending portion 15cc disposed on the right side.

Of these rear extending portions 15c, the left inner-side rear extending portion 15cb and the right-side rear extending portion 15cc are disposed to be spaced apart from each other on the respective left and right sides over the center portion of the upper front-side shock absorbing member 15 in the vehicle width direction. Thereby, at the rear side of the upper front-side shock absorbing member 15 and the vehicle-width-direction center portion thereof, there is provided a recess-shaped space 156 which forms a recess shape toward the front side as viewed in plan and passes therethrough in the up-down direction (see FIG. 6).

These rear extending portions 15c are each formed by integrating an inclined portion 15cs on the base side in the rearward extending direction, and a horizontal portion 15cf on the tip side. As shown in FIGS. 4 and 8, the inclined portion 15cs extends to be inclined rearward and downward so as to be disposed also below the bonnet 3 from the rear end of the rear portion 15b. The rear end of the rear portion 15b is located at a position corresponding to the rear end of the top face portion 14a of the bumper face upper 14 in the front-rear direction. Furthermore, in this example, the inclined portions 15cs of the left outer-side rear extending portion 15ca and the left inner-side rear extending portion 15cb are continuously formed in the vehicle width direction so as to connect these (see FIG. 6).

The horizontal portion 15cf extends substantially horizontally rearward on the lower side with respect to the bonnet inner panel 3b (see FIGS. 4 and 8).

As shown in FIGS. 4, 6, and 8, the horizontal portion 15cf of each of the three rear extending portions 15c has a mounting hole 154 passing therethrough in the up-down direction for mounting on the upper rear-side shock absorbing member 16 and the top face portion 1a (shroud upper 2) of the shroud 1, which will be described later.

As shown in FIG. 6, the horizontal portions 15cf of the left outer-side rear extending portion 15ca and the left inner-side rear extending portion 15cb each have one mounting hole 154, while the horizontal portion 15cf of the right-side rear extending portion 15cc has a plurality of (three, in this example) the mounting holes 154. Specifically, the horizontal portion 15cf of the right-side rear extending portion 15cc has the mounting holes 154 at two portions on the respective inner and outer end sides in the vehicle width direction and at a portion near the left side of a center thereof.

Furthermore, the rear portion 15b of the upper front-side shock absorbing member 15 and the rear extending portion 15c thereof correspond to the upper rear-side shock absorbing member disposition region Z as described above. Thus, the rear portion 15b and the rear extending portion 15c have higher rigidity than the front portion 15a when the upper front-side shock absorbing member 15 and the upper rear-side shock absorbing member 16 are assembled.

Accordingly, predetermined areas of the rear portion 15b and the rear extending portion 15c, which will be described later, have through holes 155 and 157 passing therethrough in the up-down direction (see FIG. 6), so that the rigidity in the up-down direction is prevented from becoming too high.

As shown in FIG. 6, the through hole 155 is disposed between, in the rear portion 15b, the connecting portion 72 and the engaging protrusion 71 which are adjacent to each other in the vehicle width direction. These through holes 155 are each opened in a substantially rectangular shape extending in the vehicle width direction as viewed in plan.

Thus, at the rear portion 15b of the upper front-side shock absorbing member 15, a plurality of (four, in this example) the through holes 155 are disposed so as to be substantially aligned in the vehicle width direction, and these through holes 155 form a through hole forming line 155L. Thereby, as shown in FIG. 6, the rear portion 15b is bent with respect to a collision load input from the front side or the diagonally upper front side, and the front portion 15a, for example, goes downward (namely, it is a folding starting point for folding in the front-rear direction without bracing (see the front portion 15a indicated by a virtual line in FIG. 4)).

Namely, the upper front-side shock absorbing member 15 is formed to have higher rigidity than the upper rear-side shock absorbing member 16 with respect to a collision load input from the diagonally upper front side (diagonally upward at about 20 degrees with respect to the horizontal plane), while the above-described through holes 155 are disposed at the rear portion 15b, so that the rise of a load absorbed by the upper front-side shock absorbing member 15 at the initial stage of collision can be prevented from becoming too high.

As shown in FIG. 6, the upper front-side shock absorbing member 15 has, other than the through holes 155, the through hole 157, for example, astride the horizontal portion 15cf of the right-side rear extending portion 15cc and the inclined portion 15cs thereof. Thus, the upper front-side shock absorbing member 15 has the through hole 157 also at the rear extending portion 15c, so that the rigidity of the upper rear-side shock absorbing member disposition region Z in the up-down direction is reduced.

Next, of the above-described upper shock absorbing members 15 and 16, the upper rear-side shock absorbing member 16 will be described in detail. As shown in FIGS. 4, 5, and 7 to 9, the upper rear-side shock absorbing member 16 is formed in a substantially left-right symmetric shape as viewed in plan (see FIG. 5) and is formed by integrating a front portion 40 extending rearward so as to be disposed below the bonnet 3 from the front side of the bonnet 3, and a rear portion 50 disposed below the bonnet 3.

The front portion 40 includes a front-side inclined portion 41, a receiving portion 42, a rear-side inclined portion 43, and a horizontal portion 44 in this order from the front to the rear.

Here, as shown in FIG. 3, a latch accommodation portion 1c accommodating a latch mechanism (illustration omitted) is disposed at a vehicle-width-direction center portion of an upper portion of the shroud 1. The latch mechanism is engaged with a striker (illustration omitted) in an unlockable manner which is provided at a vehicle-width-direction center portion of a front edge lower portion of the bonnet inner panel 3b.

Meanwhile, as shown in FIG. 5, at the rear side of the upper rear-side shock absorbing member 16 and the vehicle-width-direction center portion thereof, there is provided a recess-shaped space 166 which forms a recess shape toward the front side and passes therethrough in the up-down direction, similarly to the above-described recess-shaped space 156 (see FIG. 6) which the upper front-side shock absorbing member 15 has.

Specifically, the recess-shaped space 166 of the upper rear-side shock absorbing member 16 is formed in a recess shape toward the front side from a vehicle-width-direction center of a rear end of the upper rear-side shock absorbing member 16 up to portions corresponding to the rear portion 50 and the horizontal portion 44 and rear-side inclined portion 43 of the front portion 40.

The recess-shaped spaces 156 and 166 respectively formed at the upper front-side shock absorbing member 15 and the upper rear-side shock absorbing member 16 when these are assembled substantially coincide with each other as viewed in plan and are through holes as escape portions for avoiding interference with the striker at the time of closing the bonnet 3. A portion corresponding to a striker of the shroud upper 2 provided at the top face portion 1a of the shroud 1 also has a through hole 2b as an escape portion for the striker (see FIG. 3).

The front-side inclined portion 41 extends in the vehicle width direction along the top face portion 14a of the bumper face upper 14 and, as shown in FIGS. 4 and 7 to 9, extends to be inclined in a front-low rear-high shape from a position slightly behind the rear end of the front portion 15a of the upper front-side shock absorbing member 15.

As shown in the drawings, the receiving portion 42 extends rearward astride the front edge of the bonnet 3 from a rear end of the front-side inclined portion 41 located on the front side with respect to the bonnet 3 up to below the bonnet 3.

The receiving portion 42 substantially horizontally extends along the front-side horizontal portion 14cb of the bumper face upper 14 from the lower side so as to be able to receive the parting seal 3d provided at the front edge lower portion of the bonnet 3 via the bumper face upper 14 at the time of closing the bonnet 3.

Here, as shown in FIGS. 5 and 7, at a boundary portion between the front-side inclined portion 41 and the receiving portion 42, a plurality of (two, in this example) connecting portions 162 are disposed along the vehicle width direction which connect to the upper front-side shock absorbing member 15 in the up-down direction via a connector.

Specifically, the connecting portions 162 are formed in a substantially horizontal seat surface shape at portions corresponding to, as viewed in plan, the respective connecting portions 72 (see FIG. 6) formed at the upper front-side shock absorbing member 15 and each have a connecting hole 162a passing therethrough in the up-down direction at a center portion as viewed in plan.

As shown in FIG. 7, the upper front-side shock absorbing member 15 and the upper rear-side shock absorbing member 16 are fastened and fixed in the up-down direction at the respective connecting holes 72a and 161a via the rivet R as a connector.

Furthermore, as shown in FIGS. 5 and 11, at the receiving portion 42, a plurality of (three, in this example) engaging holes 163 are disposed which engage with, in the up-down direction, the engaging protrusions 71 (see FIGS. 6 and 11) provided on the upper front-side shock absorbing member 15 side.

Specifically, the engaging holes 163 are disposed at, in the receiving portion 42, portions corresponding to, as viewed in plan, the respective engaging protrusions 71 formed at the upper front-side shock absorbing member 15 and are each engaged with the claw 71a provided at the engaging protrusion 71 as shown in, for example, FIG. 11.

As shown in FIGS. 4 and 7 to 9, the rear-side inclined portion 43 is inclined rearward and downward from a rear end of the receiving portion 42 together with the rear-side inclined portion 14cd of the bumper face upper 14.

The horizontal portion 44 substantially horizontally extends from a rear end (lower end) of the rear-side inclined portion 43 together with the rear-side horizontal portion 14ce of the bumper face upper 14.

As shown in FIGS. 5 and 9, at the horizontal portion 44, a plurality of connecting holes 161 are disposed along the vehicle width direction which pass therethrough in the up-down direction so as to be connectable to the bumper face upper 14 by using a connector.

Here, in a state where the rear-side horizontal portion 14ce of the bumper face upper 14 is disposed from above at the horizontal portion 44, the plurality of connecting holes 161 formed at the horizontal portion 44 coincide with, as viewed in plan, respective connecting holes 14d (see FIG. 3) formed at the rear-side horizontal portion 14ce (namely, communicate therewith in the up-down direction).

As shown in FIG. 9, the rear-side horizontal portion 14ce of the bumper face upper 14 and the horizontal portion 44 are fastened and fixed at the respective connecting holes 14d and 161 in the up-down direction via the rivet R as a connector.

Furthermore, as shown in FIG. 5, the horizontal portion 44 and the above-described receiving portion 42 respectively have through holes 164a and 164b and a through hole 165 which pass therethrough in the up-down direction. The through holes 164a and 164b formed at the horizontal portion 44 are, on each of the left and right sides of the horizontal portion 44, formed in, as viewed in plan, a rectangular shape elongated along the vehicle width direction respectively between the third and fourth connecting holes 161 and between the fourth and fifth connecting holes 161 from the vehicle-width-direction inner side.

Meanwhile, the through holes 165 formed at the receiving portion 42 are, on each of the left and right sides of the receiving portion 42, formed at two portions on the respective inner and outer sides of the engaging hole 163 in the vehicle width direction and at a portion on the vehicle-width-direction inner side with respect to the connecting portion 72 so as to have a width smaller than the through holes 164a and 164b each formed at the horizontal portion 44 along the vehicle width direction.

As shown in FIGS. 4, 5, and 7 to 9, the rear portion 50 is formed by integrating, below the bonnet 3, a stepped-down portion 51 stepped down rearward from a rear end of the horizontal portion 44, namely, from a rear end of the front portion 40, and a mounting portion 52 extending rearward from a lower end of the stepped-down portion 51.

The stepped-down portion 51 includes a stepwise stepped-down portion 51a stepped down rearward stepwise from the rear end of the front portion 40 of the upper rear-side shock absorbing member 16 (see FIGS. 4, 5, and 9), a linear stepped-down portion 51b stepped down linearly (see FIGS. 5 and 8), and a stepped-down portion 51c stepped down linearly in the up-down direction with a smaller step in the up-down direction than the linear stepped-down portion 51b (see FIGS. 5, 7, and 8).

As shown in FIG. 5, the mounting portions 52 are provided on the respective left and right sides of the upper rear-side shock absorbing member 16, and these left and right mounting portions 52 are disposed to be spaced apart from each other on both sides over the center portion in the vehicle width direction and are formed in a substantially left-right symmetric shape.

The mounting portions 52 have a plurality of (eight, in this example) mounting holes 53 passing therethrough in the up-down direction for mounting on the shroud 1. Specifically, as shown in FIG. 5, each four of the plurality of mounting holes 53 formed at the mounting portions 52 are disposed at each of the left and right mounting portions 52. Of these mounting holes 53, on each of the left and right sides, two mounting holes 53 located on the vehicle-width-direction inner side are designated as a first mounting hole 53a and a second mounting hole 53b in this order from the vehicle-width-direction inner side to the outer side.

Furthermore, as shown in FIGS. 3, 4, and 8, the shroud 1 is disposed below the mounting portion 52, and particularly at a portion where the first mounting hole 53a and the second mounting hole 53b are formed in the vehicle width direction, the mounting portion 52 is disposed with respect to the top face portion 1a of the shroud 1 via the shroud upper 2 in a state of facing thereto in the up-down direction substantially without a gap (see FIGS. 4 and 8).

The upper rear-side shock absorbing member 16 is mounted on the top face portion 1a of the shroud 1 by using a mounting tool at the first and second mounting holes 53a and 53b on each of the left and right sides and at a mounting hole 1b of the top face portion 1a of the shroud 1 and a mounting hole 2a of the shroud upper 2 which are formed corresponding to these.

Additionally, the upper rear-side shock absorbing member 16, when mounted on the top face portion 1a of the shroud 1 and the shroud upper 2, is co-fastened to the upper front-side shock absorbing member 15.

Specifically, in a state where the upper rear-side shock absorbing member 16 and the top face portion 1a of the shroud 1 are disposed so as to interpose the upper front-side shock absorbing member 15 and the shroud upper 2 therebetween in the up-down direction, the mounting holes (53a or 53b), 154, 2a, and 1b respectively formed at the upper rear-side shock absorbing member 16, the upper front-side shock absorbing member 15, the upper rear-side shock absorbing member 16, the shroud upper 2, and the top face portion 1a of the shroud 1 communicate with each other in the up-down direction, so that these four members are co-fastened by using the mounting tool. In this example, as the mounting tool, the bolt B and the nut N are used for the first mounting hole 53a on each of the left and right sides of the upper rear-side shock absorbing member 16 (see FIG. 4), and the clip C is used for the other mounting holes 53 (see FIG. 8).

Furthermore, when the upper rear-side shock absorbing member 16 is mounted on the shroud 1, with respect to the upper front-side shock absorbing member 15, the connecting holes 162a and 72a are previously connected by using the rivet R as described above (see FIG. 7), and the engaging protrusion 71 and the engaging hole 163 engage with each other (see FIG. 11). Thus, the upper rear-side shock absorbing member 16 and the upper front-side shock absorbing member 15 are mounted on the shroud 1 in a sub-assembled state.

Furthermore, as shown in FIG. 9, each of the left and right sides of the vehicle-width-direction center portion 30b at the front edge of the bonnet 3 includes a stop rubber 60. The stop rubber 60 is a buffer member abutting against a top face portion of the shroud upper 2 at the time of closing the bonnet 3 to reduce shock and is fitted to and held by the bonnet inner panel 3b in a downward protruding shape.

As shown in FIGS. 5 and 9, each of the left and right sides of the mounting portion 52 of the upper rear-side shock absorbing member 16 has a through hole 61 passing therethrough in the up-down direction as an escape hole for avoiding interference with the stop rubber 60 at the time of closing the bonnet 3.

Furthermore, as shown in FIGS. 5 and 10, in the vehicle width direction of the mounting portion 52 of the upper rear-side shock absorbing member 16, a portion corresponding to the headlamp 22 has a convex raised portion 54 raised above the vicinity to avoid interference with the headlamp 22 disposed below the portion.

The vehicle front structure of the present embodiment is a vehicle front structure including, as shown in FIGS. 1 to 4, the bumper face 7 provided at the vehicle-body front face (see FIGS. 1, 3, and 4), the bumper face upper 14 provided above the bumper face 7 (see FIGS. 3 and 4), and the bumper beam 4 extending in the vehicle width direction on the rear side of the bumper face 7 (see FIGS. 1 and 4) and includes the upper front-side shock absorbing member 15 (first shock absorbing member) provided inside the bumper face upper 14 to absorb a load from the diagonally upper front side as shown in FIGS. 1 and 3 to 6, the lower shock absorbing member 6 (second shock absorbing member) mounted on the front face portion of the bumper beam 4 to absorb a load from the front side as shown in FIGS. 1 and 4, and the intermediate shock absorbing member 30 (third shock absorbing member) disposed below the upper front-side shock absorbing member 15 and between the bumper face 7 and the bumper beam 4 (see FIG. 4) to absorb a load from the diagonally upper front side as shown in FIGS. 1, 2, and 4, wherein the rigidity of the upper front-side shock absorbing member 15 and intermediate shock absorbing member 30 in the up-down direction is set to be higher than the rigidity of the lower shock absorbing member 6 in the front-rear direction.

According to the configuration, an insufficiency of absorption of a load from the diagonally upper front side in the upper front-side shock absorbing member 15 provided at a region of the bumper face upper 14 is compensated for by the intermediate shock absorbing member 30 provided on the side of a lower portion with respect to the region of the bumper face upper 14, so that an increased amount of absorption of a load from the diagonally upper front side can be achieved.

Thus, even when, as the vehicle height (vehicle nose position) becomes higher, a collision load input from the diagonally upper front side with respect to the vehicle is intensively input to the front end side from the entire region including the top face of the bumper face upper 14, the rise (injury value) of the load absorbed (received) by the vehicle at the initial stage of collision can be prevented from becoming too high.

In an aspect of the present disclosure, the intermediate shock absorbing member 30 has the lower end 30d (see FIG. 4) disposed so as to be located above the lower shock absorbing member 6 (see FIGS. 1 and 4).

According to the configuration, the intermediate shock absorbing member 30 can absorb a load from the diagonally upper front side without negatively affecting a load absorption performance from the front side which the lower shock absorbing member 6 provided at the front face portion of the bumper beam 4 has.

In an aspect of the present disclosure, as shown in FIG. 1, the upper front-side shock absorbing member 15 is disposed between the left and right headlamps 22, the intermediate shock absorbing member 30 includes the vehicle-width-direction center portion 30b corresponding to the lower side between the left and right headlamps 22, and the vehicle-width-direction outer-side portion 30a extending from the vehicle-width-direction center portion 30b up to a position below the headlamp 22, and the vehicle-width-direction outer-side portion 30a is disposed at a position above the vehicle-width-direction center portion 30b (see FIGS. 1 and 2).

According to the configuration, the vehicle-width-direction outer-side portion 30a is disposed at the position above the vehicle-width-direction center portion 30b, so that a load from the diagonally upper front side can be effectively absorbed at a position higher than the vehicle-width-direction center portion 30b.

This can compensate for the insufficiency of the amount of absorption of a collision load from the diagonally upper front side, which is caused by not disposing the upper front-side shock absorbing member 15 above the vehicle-width-direction outer-side portion 30a of the intermediate shock absorbing member 30, as the headlamp 22 is disposed thereabove.

In an aspect of the present disclosure, as shown in FIGS. 1 and 3 to 5, the upper rear-side shock absorbing member 16 (fourth shock absorbing member) having lower rigidity in the up-down direction than the upper front-side shock absorbing member 15 is continuously disposed behind the upper front-side shock absorbing member 15.

The upper front-side shock absorbing member 15 is formed to have higher rigidity with respect to a collision load from the diagonally upper front side than the upper rear-side shock absorbing member 16, so that, in the F-S characteristics (characteristics indicating a relationship between an amount of absorption of a collision load and an amount of entry into a vehicle) at the time of front-end collision, an amount in which a collision object enters the vehicle is suppressed while firmly securing the rise of the amount of absorption of a load at the initial stage of collision. Consequently, amounts of shock absorption of the upper shock absorbing members 15 and 16 can be prevented from running out.

Meanwhile, the upper rear-side shock absorbing member 16 is set to have lower rigidity than the upper front-side shock absorbing member 15 located on the front side, so that the shock can be firmly absorbed within a range in which the amount of shock absorption of the shock absorbing member does not run out.

Furthermore, although a collision load input from above a vehicle-body front portion is input to the front portion of the bonnet 3, as the vehicle height becomes higher, it is easily input not only to the front portion of the bonnet 3 but also to a rear portion of the region of the bumper face upper 14.

Even in this case, the upper rear-side shock absorbing member 16 provided at the rear portion of the region of the bumper face upper 14 as in this example is set to have lower rigidity in the up-down direction than the upper front-side shock absorbing member 15, so that, with respect to a collision load input from above the rear portion of the region of the bumper face upper 14, the rise (the injury value becomes higher) of the amount of absorption (amount of reception) of a load at the initial stage is suppressed and the shock can be thereby reduced.

Meanwhile, a collision load input from the front side or the diagonally upper front side with respect to the region of the bumper face upper 14 can be firmly received by the upper front-side shock absorbing member 15 having high rigidity which is provided on the front end side of the region of the bumper face upper 14. This secures the amount of load rise at the initial stage of collision in the F-S characteristics at the time of front-end collision, so that the amount of shock absorption which the shock absorbing member can absorb can be consequently prevented from running out.

Accordingly, although when a pedestrian lightly collides with a vehicle body from the front side, a collision mode typical of pedestrians occurs in terms of, for example, a portion of the collision with respect to the vehicle body or the input direction of the collision load to the vehicle body, the vehicle front structure of the present embodiment can appropriately absorb a collision load from the viewpoint of protecting pedestrians according to various collision modes.

The present disclosure is not limited to only the configurations of the above-described embodiment and can be formed in various embodiments.

What is claimed is:

1. A vehicle front structure comprising:
    a bumper face provided at a vehicle-body front face;
    a bumper face upper provided above the bumper face;
    a bumper beam extending in a vehicle width direction on a rear side of the bumper face;
    a first shock absorbing member provided inside the bumper face upper to absorb a load from a diagonally upper front side;
    a second shock absorbing member mounted on a front face portion of the bumper beam to absorb a load from a front side; and
    a third shock absorbing member disposed below the first shock absorbing member and between the bumper face and the bumper beam to absorb a load from the diagonally upper front side,
    wherein
    rigidity of the first and third shock absorbing members in an up-down direction is higher than rigidity of the second shock absorbing member in a front-rear direction,
    a lower end of the third shock absorbing member is disposed so as to be located above the second shock absorbing member,
    the first shock absorbing member is disposed between headlamps provided on respective left and right sides of the vehicle-body front face,
    the third shock absorbing member comprises: a vehicle-width-direction center portion corresponding to a lower side between the left and right headlamps; and a vehicle-width-direction outer-side portion extending from the vehicle-width-direction center portion up to a position below the headlamp, and the vehicle-width-direction outer-side portion is disposed at a position above the vehicle-width-direction center portion.

2. The vehicle front structure according to claim 1, wherein
a fourth shock absorbing member having lower rigidity in the up-down direction than the first shock absorbing member is continuously disposed behind the first shock absorbing member.

3. The vehicle front structure according to claim 2, wherein
the first shock absorbing member is configured of fiber reinforced plastic,
the second shock absorbing member is configured of EA foam material, and
the third shock absorbing member is configured of synthetic resin.

4. The vehicle front structure according to claim 1, wherein
the first shock absorbing member is configured of fiber reinforced plastic,
the second shock absorbing member is configured of EA foam material, and
the third shock absorbing member is configured of synthetic resin.

5. The vehicle front structure according to claim 4, wherein
the synthetic resin is polypropylene.

6. A vehicle front structure comprising:
a bumper face provided at a vehicle-body front face;
a bumper face upper provided above the bumper face;
a bumper beam extending in a vehicle width direction on a rear side of the bumper face;
a first shock absorbing member provided inside the bumper face upper to absorb a load from a diagonally upper front side;
a second shock absorbing member mounted on a front face portion of the bumper beam to absorb a load from a front side; and
a third shock absorbing member disposed below the first shock absorbing member and between the bumper face and the bumper beam to absorb a load from the diagonally upper front side,
wherein
rigidity of the first and third shock absorbing members in an up-down direction is higher than rigidity of the second shock absorbing member in a front-rear direction,
the first shock absorbing member is disposed between headlamps provided on respective left and right sides of the vehicle-body front face,
the third shock absorbing member comprises: a vehicle-width-direction center portion corresponding to a lower side between the left and right headlamps; and a vehicle-width-direction outer-side portion extending from the vehicle-width-direction center portion up to a position below the headlamp, and
the vehicle-width-direction outer-side portion is disposed at a position above the vehicle-width-direction center portion.

7. The vehicle front structure according to claim 6, wherein
a fourth shock absorbing member having lower rigidity in the up-down direction than the first shock absorbing member is continuously disposed behind the first shock absorbing member.

8. The vehicle front structure according to claim 6, wherein
the first shock absorbing member is configured of fiber reinforced plastic,
the second shock absorbing member is configured of EA foam material, and
the third shock absorbing member is configured of synthetic resin.

9. The vehicle front structure according to claim 8, wherein
the synthetic resin is polypropylene.

10. The vehicle front structure according to claim 3, wherein
the synthetic resin is polypropylene.

* * * * *